Patented Sept. 28, 1948

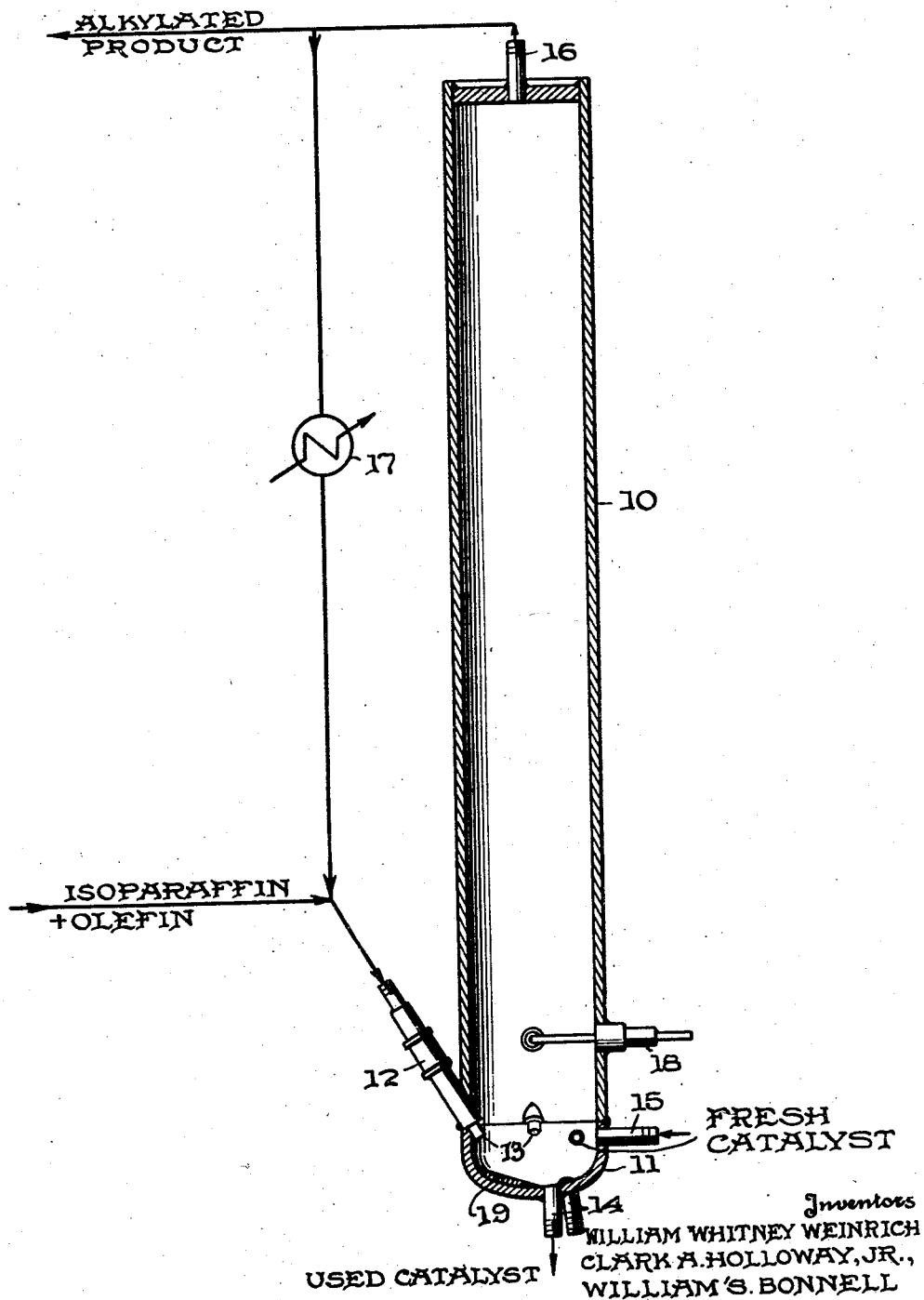

2,450,174

UNITED STATES PATENT OFFICE 2,450,174

CATALYTIC CONTACT PROCESS

William W. Weinrich, Bartlesville, Okla., Clark A. Holloway, Jr., Oakmont, Pa., and William S. Bonnell, Port Arthur, Tex., assignors to Gulf Research & Development Company, Pittsburgh, Pa., a corporation of Delaware Application January 11, 1945, Serial No. 572,312

10 Claims. (Cl. 260—683.4)

This invention relates to a catalytic contact process and, more particularly to a process for securing intimate contact between reactant fluids and catalysts, as in the alkylation or isomerization of hydrocarbons by the use of solid catalysts.

It has been the practice in the alkylation of hydrocarbons or similar chemical operations, including the isomerization of hydrocarbons, to cause intimate contact between the reactants and catalysts by means of turbo mixers, centrifugal apparatus and the use of various porous devices, such as thimbles. However, when it is found desirable to use solid catalysts, such as aluminum chloride, the above types of contact means afford certain difficulties of operation. The complexes, slurries or suspensions of solid catalysts tend to close the pores of porous materials and to erode the moving parts of any type of agitator which may be used. Also, erosion is encountered on the metal surfaces where there is close clearance or at points where there are sharp changes in the flow direction.

Another difficulty encountered with complex, slurry or suspension type catalysts, when using an apparatus containing a mechanically driven impeller and particularly at super-atmospheric pressures, is that of effectively sealing the reactants from the atmosphere at the impeller shaft. Ordinarily this is accomplished by the use of a metal-to-metal seal and/or packing gland. Because the slurry type catalyst tends to be erosive, the metal-to-metal surfaces and the packing are difficult to maintain properly. Further, in the conventional alkylation equipment, settlers are employed where the catalysts are separated and then recycled to the reactor by a pump. Here, again, the slurry type catalyst tends to erode the settlers and pump and plug the lines and it is difficult to maintain the seals or packing on the catalyst pump.

We have discovered that by using a method and apparatus which utilizes the kinetic energy derived by pumping the hydrocarbon reactants for mixing rather than mechanical mixing means and by using an integral catalyst settling or refluxing zone, superimposed over the reaction zone, we can overcome the difficulties enumerated by the prior art processes.

In carrying out our invention, we use a vertical cylindrical chamber having in its lower section a reaction zone and in its upper section a catalyst refluxing zone. The lower end of the cylindrical chamber comprises a surface at an acute angle to the vertical axis of the vessel such as a slanting or rounded bottom as the lower extremity of the reaction zone and just above this rounded bottom and pointed downwardly toward it, is at least one inlet for the reactant charge. Somewhere near the lower end of the chamber there is preferably at least one inlet for admission of catalyst and at least one outlet for spent catalyst discharge.

The catalyst reflux zone has at or near the top thereof a conduit through which the reaction products are withdrawn. The reaction products are preferably divided into two portions, one of which is recycled so as to enter with the fresh reactant material, and the other of which is passed through the conventional fractionating and purifying equipment. By this recycling we increase the isoparaffin olefin ratio of the hydrocarbon fed before it contacts the catalyst from the conventional 3 to 5:1 to the range of 10 to 150:1 depending on the quantity of reaction products recycled.

The accompanying drawing illustrates, partly in section and partly diagrammatically, one specific embodiment of an apparatus useful in the practice of the invention.

Referring to the drawing, the apparatus comprises a cylindrical vessel 10 having a rounded bottom 11. Near the rounded bottom is a reactant inlet 12 having a restricted jet orifice 13, preferably of a non-corrosive alloy. This inlet projects through the wall of the vessel only far enough to deliver fluid at a point away from the vertical axis of the vessel. The inlet is inclined at an angle acute to the vertical axis of the vessel and is adapted to deliver fluid in a downward direction. In the lower part of the rounded portion 11 is a conduit 14 for withdrawing used catalyst, and fresh catalyst is introduced by conduit 15 located at a point above the rounded bottom. The reaction product is taken off by conduit 16 located at or near the top of the cylindrical vessel. The vessel illustrated is provided with a thermocouple well 18. The rounded bottom may further be provided with a slanted plate 19 beneath the reactant inlet 12.

In the process illustrated in the drawing, a mixture of isoparaffin and olefin is introduced through conduit 12 under pressure, so that when it leaves the restricted orifice 13 considerable turbulence is caused in the rounded bottom of the vessel. As the reaction takes place, the reaction products rise in the vessel, carrying some catalyst which refluxes or falls back to the lower portion of the vessel and the used catalyst may be withdrawn and fresh catalyst added by means of valves (not shown) in conduits 14 and 15, respectively. The alkylated product is withdrawn through conduit 16 and passed off to the usual fractionation and purification apparatus, or a portion of it is preferably returned to be mixed with fresh reacting material. In returning a portion of the reaction product, it may be passed through a heat exchanger 17, so as to control the temperature of the reactants by removing or supplying heat as required. This external heat exchanger has the advantage over an internal heat exchanger in that the tube bundle is not in contact with the catalyst, is more accessible, and is easier to maintain. In this manner, the need for cooling means within the reaction vessel is eliminated and at the same time the isoparaffin-olefin ratio of the charge is raised from the range 3 to 5:1 to the range 10 to 150:1, depending on the portion of reaction product recycled.

It will be seen that in the above embodiment of the invention, a plurality of orifices may be used to introduce the reacting material and cause turbulence and also that fresh catalyst may be introduced at a plurality of points in the vessel. The restricted orifice 13 is adapted to deliver the reactants in the form of a jet but other means which would have the effect of delivering at a rapid rate and causing turbulence could be used. In practice it has been found that the height of the reactor desirable to insure adequate catalyst reflux and essentially complete removal of entrained catalyst is equal to about 10 times the diameter of the vessel.

Example I

In a typical operation of the process using the above described apparatus, ethylene was absorbed in liquid isobutane derived from natural gas and containing certain impurities. A solution of the ethylene in the isobutane approximating 13.2 per cent by volume of ethylene was made up having the following overall composition:

|  | Mol, Per Cent | Per Cent by Liquid Volume |
| --- | --- | --- |
| Ethane | 1.9 | 1.9 |
| Ethylene | 15.9 | 13.2 |
| Propane | 3.3 | 2.9 |
| Isobutane | 76.6 | 79.7 |
| n-Butane | 2.3 | 2.3 |
|  | 100.0 | 100.0 |

This charge was fed to the apparatus at a rate corresponding to 8.5 barrels per hour per barrel of catalyst held in the reaction zone. The recycled reaction product was used to dilute the charge so that the mol ratio of isobutane to ethylene in the charge to the reaction zone was 113:1. The temperature was held at 130° F. and the pressure at 365 pounds per square inch absolute. Under these conditions, a yield of debutanized alkylate amounting to 235 per cent by weight of the ethylene charge was obtained. During the run fresh catalyst was added to the reactor at a rate corresponding to a production of 27.6 gallons of alkylate per pound of aluminum chloride. Spent catalyst was removed from the reactor at a rate sufficient to maintain a constant amount of catalyst in the reactor. The composition of the debutanized alkylate was as follows:

| Constituent | Per Cent by Liquid Volume |
| --- | --- |
| Isopentane | 2.3 |
| 2,3-Dimethylbutane | 72.3 |
| Methylpentanes | 3.7 |
| Heptanes | 5.7 |
| Octanes and Heavier | 16.0 |
|  | 100.0 |

This material has an A. S. T. M. motor method octane number (clear) of 93.6.

The catalyst employed in this case was a slurry consisting of anhydrous aluminum chloride suspended in an aluminum chloride complex. However, the invention contemplates the use of other solid catalysts and particularly other aluminum halides. The catalyst may be in the form of a suspension, slurry, or solution and the apparatus is particularly designed to avoid the erosion usually caused by slurries or suspensions and by solutions which may become suspensions or slurries during the reaction. Thus the word "slurry" when used in the specification and claims is meant to include solid catalyst in any of these forms. While the process illustrated in the drawing is directed to an alkylation reaction, the apparatus and process generally are applicable also to isomerization reactions as illustrated in the following example:

Example II

An isomerization reaction similar to the alkylation reaction of Example I was carried out by using a charge stock having the following composition:

|  | Mol, per cent |
| --- | --- |
| Propane | 0.0 |
| Isobutane | 3.6 |
| N-butane | 95.1 |
| Pentanes | 1.3 |
| Total | 100.0 |

HCl was added to the charge in amount equal to 10.6 mol per cent.

This charge was fed to the reactor which was maintained at a temperature of 240° F. and a pressure of about 668 pounds per square inch absolute. Aluminum chloride was used as the catalyst in an amount equivalent to 0.0487 pound per gallon of isobutane produced. Using a velocity through the jet of 30.0 feet per second and a feed rate of the total charge at reactor conditions of about 2000 cc. per hour and a recycle rate of about 34,600 cc. per hour, the yield per pass had the following composition:

|  | Mol, per cent |
| --- | --- |
| Propane | 1.1 |
| Isobutane | 41.3 |
| N-butane | 54.5 |
| Pentanes | 3.1 |
| Total | 100.0 |

The ultimate yield of isobutane showed an overall efficiency of 93.1 per cent.

While the process and apparatus are adapted to batch operations, continuous operation is preferable and the invention has been particularly devised for such procedure. One of the important features of the invention is the catalyst-reflux zone, whereby the catalyst will not be carried out of the apparatus with the reaction product but will be refluxed back. This eliminates the catalyst recycle and equipment employed in conventional operations. In addition, the catalyst reflux is desirable because it provides additional contacting of the reactants and catalyst. In practice it has been found that the height of the reactor desirable to insure adequate catalyst reflux and essentially complete removal of entrained catalyst is equal to about 10 times the diameter of the vessel when operating with a recycle made up of reaction product and fresh feed in a ratio not greater than 30:1.

It will be noted that the catalyst slurry and reactants do not enter together since this would cause the erosion. Further, the catalyst is not recycled and is thus not likely to clog lines.

In the above description and in the claims the word "rapidly" in reference to the introduction of the fluid reactants through the nozzle is meant to convey that the reactants are introduced at such a rate as to cause great turbulence. It will be seen that this rapidity may be varied somewhat but a jet velocity of from about 20 to 100 feet per second gives desired turbulence and a jet velocity of about 30 feet per second is preferable. The rapid jet to cause turbulence is to be distinguished from a fine jet or spray which, while it might have a high velocity, does not have sufficient force to cause turbulence.

Thus we have described a process for contacting reacting materials with solid catalyst slurry without the use of any agitating device other than the hydrocarbon charge to the reaction vessel, while at the same time maintaining a continuous process wherein the product is free of catalyst. The catalyst is refluxed in the reacting vessel, thereby eliminating extra apparatus or steps for the removal of catalyst.

What we claim is:

1. A process of contacting fluid reactants with a solid catalyst slurry comprising introducing the fluid reactants by means of a downwardly directed jet into the lower portion of a vessel containing catalyst slurry with sufficient force to cause substantial turbulence of said catalyst slurry, settling any catalyst that may rise to the upper portion of said vessel and causing it to flow back to the lower portion of said vessel, withdrawing the reaction product formed by contact with said catalyst from the upper portion of the vessel, and recycling a portion of said product with the reactants.

2. A process for alkylating isoparaffin with an olefin in the presence of an aluminum halide slurry catalyst comprising introducing the isoparaffin and olefin by means of a downwardly directed jet into the lower portion of a vessel containing catalyst slurry with sufficient force to cause substantial turbulence of said catalyst slurry, settling any catalyst which may rise to the upper portion of said vessel and causing it to flow back to the lower portion of said vessel, withdrawing the reaction product formed by contact with said catalyst from the upper portion of the vessel, and recycling a portion of said product with the isoparaffin and olefin.

3. A process for alkylating isobutane with ethylene in the presence of an aluminum chloride slurry catalyst comprising introducing the isobutane and ethylene by means of a downwardly directed jet into the lower portion of a vessel containing said catalyst slurry with sufficient force to cause substantial turbulence of said catalyst slurry, settling any catalyst which may rise to the upper portion of said vessel and causing it to flow back to the lower portion of said vessel, withdrawing the reaction product formed by contact with said catalyst from the upper portion of the vessel, and recycling a portion of said product with the isobutane and ethylene.

4. A process of isomerizing liquid hydrocarbons in the presence of an isomerization catalyst slurry comprising introducing the liquid hydrocarbon by means of a downwardly directed jet into the lower portion of a vessel containing an isomerization catalyst slurry with sufficient force to cause substantial turbulence of said catalyst slurry, settling any catalyst which may rise to the upper portion of said vessel and causing it to flow back to the lower portion of said vessel, withdrawing the reaction product formed by contact with said catalyst from the upper portion of the vessel, and recycling a portion of said product with the aforesaid liquid hydrocarbon.

5. The process of claim 4 wherein the catalyst slurry is an aluminum halide slurry.

6. The process of claim 5 wherein the hydrocarbon is liquid isobutane.

7. A process of contacting liquid reactants with a solid catalyst slurry comprising introducing catalyst slurry into the lower portion of a vessel, separately introducing the liquid reactants by means of a downwardly directed jet into said lower portion of said vessel containing said catalyst slurry with sufficient force to cause substantial turbulence of said catalyst slurry, settling any catalyst that may rise to the upper portion of said vessel and causing it to flow back to the lower portion of said vessel, withdrawing the reaction product formed by contact with said catalyst from the upper portion of said vessel, and recycling a portion of said product with the reactants.

8. The process of claim 7 wherein the liquid reactants are an isoparaffin and an olefin and the catalyst is an alkylation catalyst.

9. The process of claim 7 wherein the liquid reactant is a hydrocarbon and the catalyst is an isomerization catalyst.

10. A process of contacting liquid reactants with a solid catalyst slurry comprising introducing catalyst slurry into the lower portion of a vessel, separately introducing the liquid reactants by means of a downwardly directed jet into said lower portion of said vessel containing said catalyst slurry with sufficient force to cause substantial turbulence of said catalyst slurry, settling any catalyst that may rise to the upper portion of said vessel and causing it to flow back to the lower portion of said vessel, and withdrawing the reaction product formed by contact with said catalyst from the upper portion of said vessel.

WILLIAM W. WEINRICH.
CLARK A. HOLLOWAY, JR.
WILLIAM S. BONNELL.

REFERENCES CITED

The following references are of record in the file of this patent:

UNITED STATES PATENTS

| Number | Name | Date |
|---|---|---|
| 1,899,918 | Wilson | Feb. 28, 1933 |
| 1,964,560 | Denig | June 26, 1934 |
| 1,976,507 | McAfee | Oct. 9, 1934 |
| 2,000,038 | Schmalenbach | May 7, 1935 |
| 2,034,989 | Pratt | Mar. 24, 1936 |
| 2,170,306 | Ipatieff et al. | Aug. 22, 1939 |
| 2,174,883 | Ipatieff et al. | Oct. 3, 1939 |
| 2,305,026 | Munday | Dec. 15, 1942 |
| 2,317,241 | Ackerman et al. | Apr. 20, 1943 |
| 2,330,118 | Frey | Sept. 21, 1943 |
| 2,366,117 | Leonard | Dec. 26, 1944 |
| 2,373,062 | Stahly | Apr. 3, 1945 |
| 2,377,657 | Watts | June 5, 1945 |
| 2,377,935 | Gunness | June 12, 1945 |